(No Model.)
J. N. MUNDELL.
POTATO DIGGER.
No. 394,659. Patented Dec. 18, 1888.
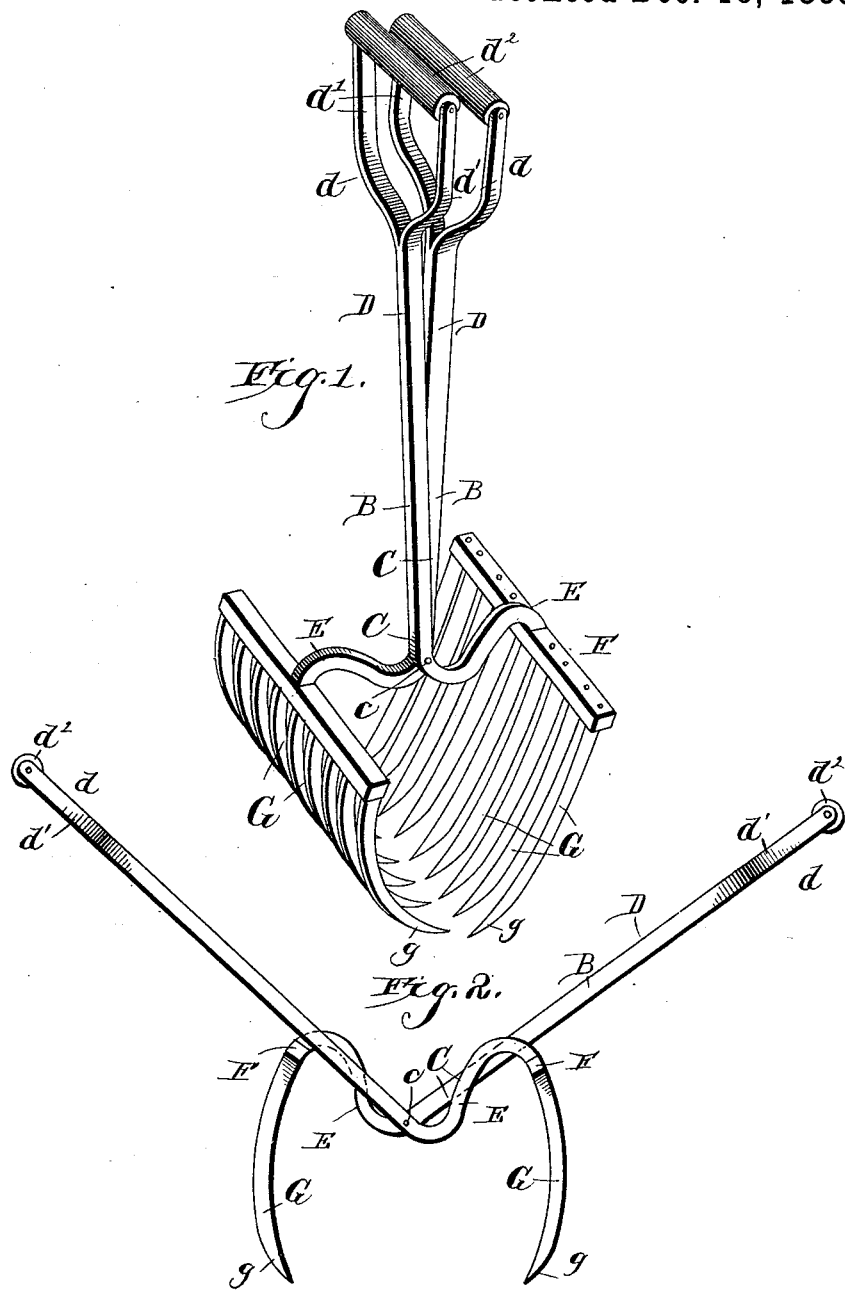
Witnesses,
Henry G. Dieterich
J. R. Diggers
Inventor.
Josephus N. Mundell
By his Attorneys

UNITED STATES PATENT OFFICE.

JOSEPHUS NEWTON MUNDELL, OF HART, MICHIGAN.

POTATO-DIGGER.

SPECIFICATION forming part of Letters Patent No. 394,659, dated December 18, 1888.

Application filed September 27, 1888. Serial No. 286,502. (No model.)

*To all whom it may concern:*

Be it known that I, JOSEPHUS NEWTON MUNDELL, a citizen of the United States, residing at Hart, in the county of Oceana and State of Michigan, have invented a new and useful Improvement in Potato-Diggers, of which the following is a specification.

My invention relates to improvements in potato-diggers; and it consists in the construction and novel combination of parts hereinafter described, illustrated in the accompanying drawings, and pointed out in the appended claim.

Figure 1 of the drawings represents a perspective view of a potato-digger embodying the invention. Fig. 2 represents a side view thereof. Fig. 3 represents a detail view to show the tines with rounded or beveled inner edges.

In the accompanying drawings, B B are the similar opposite sections of the device, which sections are of identical construction. Each section B is provided with the metallic double-armed shank C, the upper arm, D, of which is straight from the pivot $c$ to the handle at its outer end, while the lower arm, E, is preferably bent into a sigmoidal curve outward from the said pivot.

The free end of the upper arm, D, is bent outward and bifurcated to form a handle, $d$, the arms $d'$ of said bifurcation having their ends connected by a transverse rod, upon which is mounted and rotates freely the wooden sleeve $d^2$, long enough to be grasped by the hand. By means of the outward bend of the free ends of the said upper arms the hands of the operator will not come in contact when grasping the wooden sleeves $d^2$ when the sections are brought together.

F F are transverse head-bars secured centrally to the free ends of the corresponding sigmoidal lower arms of the shanks, each head-bar having the similar-curved tines G attached. The said tines have their butts secured by suitable means to the corresponding head-bars, preferably at equal distances apart, and curve downward and inward, being so arranged that the points of those attached to one head-bar will, when the device is closed, pass to one side, $g$, and come almost into contact with the points of those attached to the opposite head-bar.

The outer convex edges of the tines may be flat, but their inner concave edges, $g$, are rounded or beveled on both sides to enable the two sets of tines of the sections to be more easily brought together when in the earth.

The advantages of the described construction are as follows: When the two sections of the device are opened or separated from each other, the points of the tines strike almost vertically upon the ground, and can be pushed therein till the head-bars rest upon the surface. The points of the tines are then below the tubers in the potato-hill operated on, and the opposite sets of tines can be closed together below the contents of the hill without injuring the said contents. When the sets of tines are thus closed on each other, they form a basket-shaped receptacle, which can be drawn up from the earth, bringing out the tubers inclosed within them uninjured and not liable to decay.

The rounded or beveled inner edges of the tines enable the implement to be used more rapidly and with less power.

I am aware that hand potato-diggers have been used in which one set of tines have been arranged to coact with a plate, bar, or stop, and such construction I do not wish to claim, as it would defeat the purpose intended to be accomplished by the implement for which I ask protection of Letters Patent.

It should be observed that the tines have curves sufficiently slight or shallow to be easily forced in the earth when the device is in the position shown in Fig. 2. They can then be closed under the tubers and lifted out of the hill with the tubers within, the beveled inner edges of the tines permitting them to be more easily pulled out. The outward bend of the tops of the upper arms of the handles, as before stated, prevent the hands of the operator from striking together.

Having described my invention, I claim—

The herein-described potato-digger, composed of two similar sections, each consisting of the double-armed shank having the sigmoidal lower arm and outer or upper arm, the upper portion of which is bent outward and provided with a bifurcated handle having the roller $d^2$, which shanks are pivoted together at the junction of said arms, the head-bars secured to the outer ends of the corresponding sigmoidal arms, and the shallowly-curved tines depending from the head-bars and having the inner concave edges doubly beveled, substantially as specified.

In testimony that I claim the foregoing as my own I have hereto affixed my signature in presence of two witnesses.

JOSEPHUS NEWTON MUNDELL.

Witnesses:
S. H. WILLIAMS,
WM. H. BAILEY.